United States Patent
Lienkamp et al.

(10) Patent No.: US 8,604,637 B2
(45) Date of Patent: Dec. 10, 2013

(54) METHOD FOR HIGH VOLTAGE BUS CONTROL IN FUEL CELL VEHICLES

(75) Inventors: Sebastian Lienkamp, Budenheim (DE); Stephen Raiser, Wiesbaden (DE)

(73) Assignee: GM Global Technology Operations LLC, Detroit, MI (US)

(*) Notice: Subject to any disclaimer, the term of this patent is extended or adjusted under 35 U.S.C. 154(b) by 527 days.

(21) Appl. No.: 12/844,648

(22) Filed: Jul. 27, 2010

(65) Prior Publication Data
US 2012/0025619 A1    Feb. 2, 2012

(51) Int. Cl.
*B60L 1/00* (2006.01)

(52) U.S. Cl.
USPC ............ 307/9.1; 307/10.1; 429/9; 429/13; 429/23; 320/101; 320/136; 320/140; 323/222

(58) Field of Classification Search
USPC ........... 307/9.1, 10.1, 47, 140; 429/9, 13, 23; 320/101, 136, 140; 323/222
See application file for complete search history.

(56) References Cited

U.S. PATENT DOCUMENTS

| | | | |
|---|---|---|---|
| 6,930,897 B2* | 8/2005 | Jungreis et al. | 363/95 |
| 7,808,129 B2* | 10/2010 | Mazumder et al. | 307/140 |
| 2004/0053082 A1* | 3/2004 | McCluskey et al. | 429/9 |
| 2005/0112420 A1* | 5/2005 | Lai et al. | 429/13 |
| 2006/0220609 A1* | 10/2006 | Konoto et al. | 320/101 |
| 2007/0009770 A1* | 1/2007 | Takada et al. | 429/9 |
| 2007/0085720 A1* | 4/2007 | Fosler | 341/155 |
| 2008/0310195 A1* | 12/2008 | Seberger et al. | 363/26 |
| 2009/0011301 A1* | 1/2009 | Matsumoto et al. | 429/23 |
| 2010/0109437 A1* | 5/2010 | Fattic | 307/47 |
| 2010/0134077 A1* | 6/2010 | Krajcovic | 323/234 |

* cited by examiner

*Primary Examiner* — Jared Fureman
*Assistant Examiner* — Alfonso Perez Borroto
(74) *Attorney, Agent, or Firm* — John A. Miller; Miller IP Group, PLC

(57) ABSTRACT

A system and method for controlling the voltage on a high voltage bus in a fuel cell system in response to a failed high voltage battery. The method includes determining if the high voltage battery has failed, and disconnecting the battery from the high voltage bus in response to a failure. The method measures the voltage of the fuel cell stack by a DC boost circuit and converts the measured voltage to a voltage set-point value that sets the voltage on the high voltage bus, where the voltage set-point value changes as the measured voltage changes. A supervisory controller sets the media flow to the fuel cell stack and determines a minimum stack voltage limit value based on the stack maximum current draw that is used to determine a high voltage bus lower limit value.

21 Claims, 1 Drawing Sheet

METHOD FOR HIGH VOLTAGE BUS CONTROL IN FUEL CELL VEHICLES

BACKGROUND OF THE INVENTION

1. Field of the Invention

This invention relates generally to a system and method for providing high voltage bus control in a fuel cell vehicle in the event that a high voltage battery fails and, more particularly, to a system and method for providing high voltage bus control in a fuel cell vehicle in the event that a high voltage battery fails, where the system employs a fuel cell boost circuit for coupling a fuel cell stack to the high voltage bus that adjusts a high voltage set-point based on the fuel cell stack voltage during the battery failure.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

Most fuel cell vehicles are hybrid vehicles that employ a rechargeable supplemental high voltage power source in addition to the fuel cell stack, such as a battery or an ultracapacitor. The high voltage power source provides supplemental power for the various vehicle auxiliary load, for system start-up and during high power demands when the fuel cell stack is unable to provide the desired power. More particularly, the fuel cell stack provides power to a traction motor and other vehicle systems through a DC voltage bus line for vehicle operation. The battery provides the supplemental power to the voltage bus line during those times when additional power is needed beyond what the stack can provide, such as during heavy acceleration. For example, the fuel cell stack may provide 70 kW of power. However, vehicle acceleration may require 100 kW or more of power. The fuel cell stack is used to recharge the battery at those times when the fuel cell stack is able to meet the system power demand. The generator power available from the traction motor can provide regenerative braking that can also be used to recharge the battery through the DC bus line.

In some fuel cell system designs that employ a high voltage battery, the high voltage components, including the electric traction motor, are electrically coupled to the high voltage bus. The high voltage bus is directly connected to the battery and operates off of the battery voltage, where a DC/DC fuel cell boost circuit is provided between the fuel cell stack and the high voltage bus to allow the fuel cell stack voltage to vary independently of the DC bus voltage. Alternately, the high voltage components of the system are electrically coupled to a high voltage bus that is directly coupled to the fuel cell stack so that the components operate off the stack voltage, where a DC/DC boost circuit is provided between the high voltage bus and the battery to allow the battery voltage to vary independently of the bus voltage.

In the design where the loads are coupled directly to the battery voltage, the loads are controlled so that they draw a voltage that is within the allowable voltage range of the battery, such as 300 to 400 volts. A supervisory controller is employed that knows the allowable voltage range of the battery and controls the amount of power that the various components can draw from the bus or provide to the bus during regenerative operation. The sum of all power flows equals the power discharged from or charged into the battery and is controlled, such as by the supervisory controller, so that it does not drive the battery voltage above its upper or below its lower voltage limit, respectively. However, because of measurement errors, controller area network (CAN) message transmission time, power transients, etc., the supervisory controller may allow the loads to draw/provide power levels that in total lead to violation of the battery voltage limits. Therefore, some loads feature voltage limiting functions based on an embedded algorithm that prevents the loads from drawing/providing more power from/to the bus than possible without violation of battery voltage limits. In other words, as long as the voltage control algorithms in the component know the upper and lower battery voltage limits, they can at least temporarily react to attempts to draw/provide too much power from/to the high voltage bus without input from the supervisory controller.

In the event that the battery fails, the battery contactors are opened to disconnect the battery from the bus, but the various high voltage components, such as the electric traction motor, can still receive power from the high voltage bus as generated by the fuel cell stack through the fuel cell DC boost circuit. Usually the fuel cell DC boost controls the high voltage bus to a fixed voltage level as the bus voltage is now not defined by the battery voltage anymore. For a particular system operating condition, the supervisory controller will set the cathode compressor, anode injectors, etc., for a particular maximum stack output current and cause the high voltage components to draw a total power level that matches this stack output current and the resulting stack output voltage.

However, for the reasons discussed above as a result of supervisory controller message lag time, voltage measurement inaccuracies, power transients, etc., the amount of power being drawn from the high voltage bus by the loads at any given time may exceed the stack power at maximum stack output current. If the loads draw power from the bus that exceeds the stack limit, the fuel cell boost circuit will draw more current from the fuel cell stack than the stack is currently able to produce, which will change the stack stoichiometries. This change in stack stoichiometry affects stack operating conditions, such as a desired stack relative humidity, which causes stack degradation. The supervisory controller will correct the media flow for the proper stack stoichiometry that the loads are attempting to draw from the stack, but this control may not be quick enough to prevent stack degradation at least for some period of time.

SUMMARY OF THE INVENTION

In accordance with the teachings of the present invention, a system and method are disclosed for controlling the voltage on a high voltage bus in a fuel cell system in response to a failed high voltage battery. The method includes determining if the high voltage battery has failed, and disconnecting the battery from the high voltage bus in response to a failure. The method measures the voltage of the fuel cell stack by a DC boost circuit and converts the measured voltage to a voltage set-point value for the DC boost that sets the voltage on the high voltage bus, where the voltage set-point value changes as the measured voltage changes. A supervisory controller sets the media flow to the fuel cell stack and determines a minimum stack voltage limit value based on the stack maximum current draw that is used to determine a high voltage bus lower limit value. By using voltage limiting algorithms in the high voltage loads to prevent those loads from drawing more power from the high voltage bus than the high voltage bus limit value, the load on the high voltage bus, and hence the load on the fuel cell stack, can be confined within the desired operational limits.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for providing a high voltage set-point for a high voltage bus from a DC boost circuit based on fuel cell stack voltage in the event of a high voltage source failure is merely exemplary in nature, and is in no way intended to limit the invention or its applications or uses. For example, the discussion below is directed to determining the high voltage bus level in the event of battery failure. However, the same process can be used to determine the high voltage bus level in the event of fuel cell stack failure when a battery DC boost is being used and the high voltage components usually operate on fuel cell stack voltage.

Figure 1:
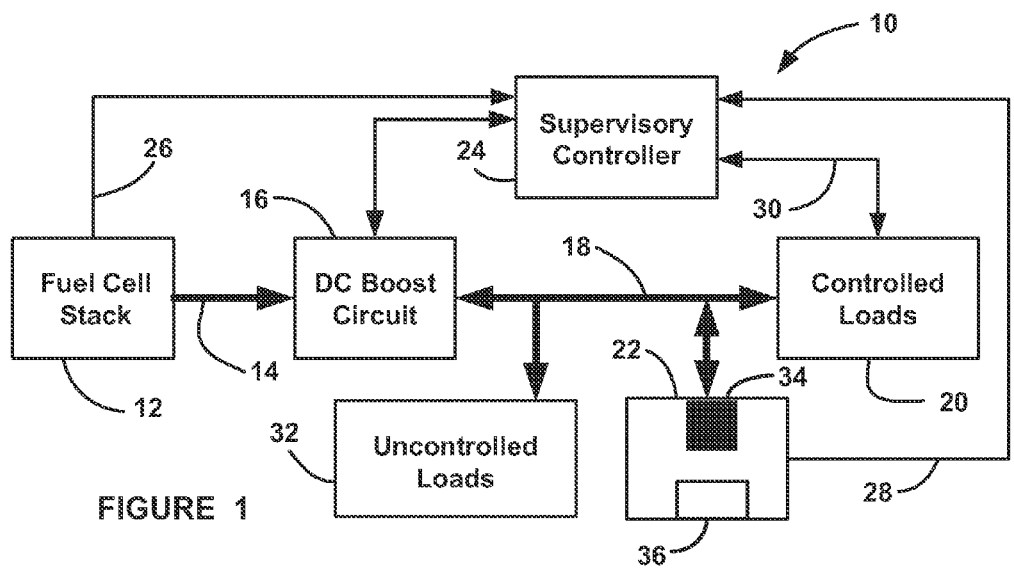
FIG. 1 is a schematic block diagram of a fuel cell system including a supervisory controller that allows a fuel cell DC/DC boost circuit to adjust a high voltage set-point during a battery failure.

FIG. 1 is a schematic block diagram of a fuel cell system 10 including a fuel cell stack 12. The fuel cell stack 12 provides power to a high voltage line 14 that is directly connected to a fuel cell DC boost circuit 16 that transfers the fuel cell stack power to the voltage level on a high voltage bus 18 in the manner discussed above. The various high voltage loads, such as an electric traction motor, that draw power from the fuel cell stack 12 are electrically coupled to the bus 18, and are identified as controlled loads 20. In this architecture, the system 10 includes a high voltage battery system 22 electrically coupled to the high voltage bus 18 so that the high voltage bus 18 operates at the output voltage of the battery system 22, as discussed above. The battery system 22 includes a high voltage battery pack, battery contactors 34 to disconnect the battery pack from the high voltage bus 18 and a battery controller 36 that provides power limits and voltage limits, as would be well understood by those skill in the art. The battery system 22 can include any battery suitable for the purposes described herein, such as a nickel-metal hydride battery, a lithium-ion battery, etc., and can also be replaced with other types of high power storage devices, such as super-capacitors. In an alternate architecture, the loads 20 may be coupled to the high voltage line 14 where the boost circuit 16 would be a battery DC boost circuit to transfer the charge/discharge power of the battery system 22 to the output voltage level of the fuel cell stack 12. The system 10 also includes uncontrolled loads 32, such as a device that converts the high voltage power from bus 18 to a low voltage for powering 12 volt loads (not shown).

A supervisory controller 24 controls the power distribution of the various elements in the system 10 based on driver input, the changing voltages of the fuel cell stack 12 and the battery system 22, and operates in a manner as discussed below. The supervisory controller 24 receives various signals from the fuel cell stack 12 on line 26 including a stack current upper limit and stack voltage lower limit value, discussed below, as well as miscellaneous signals for power balancing. Further, the supervisory controller 24 receives various signals for power balancing from the battery system 22 on line 28, as will be discussed in further detail below. The supervisory controller 24 provides high voltage lower limit voltage signals to the controlled loads 20 and receives various signals for power balancing purposes from the controlled loads 20 on line 30.

As will be discussed in detail below, the present invention proposes controlling and adjusting the high voltage set-point of the fuel cell DC boost circuit 16 in the event that the battery system 22 fails and its contactors 34 are open so that the battery system 22 is disconnected from the bus 18. As discussed above, in normal operation, the voltage level on the bus 18 is determined by the battery terminal voltage. For the case where the battery system 22 fails and its contactors 34 are open, the bus voltage level on the bus 18 is set by the boost circuit 16. Usually the boost circuit 16 controls the high voltage bus level on the bus 18 to a fixed set-point and draws as much current from the fuel cell stack 12 as needed to maintain that voltage level. However, because of measurement inaccuracies, power transients, etc., the loads 20 may draw more power from the boost circuit 16 than the stack output current limit allows, at least temporarily. Therefore the present invention changes and adjusts the voltage set-point used by the boost circuit 16 to control the bus voltage level on the bus 18 as discussed below.

When current is being drawn from the fuel cell stack 12 from the fuel cell DC boost circuit 16, the output voltage of the stack 12 goes down as the current draw goes up. Because the maximum stack current can be converted to a minimum stack voltage, a minimum bus voltage can be calculated based on the same relationship. For this discussion it is sufficiently accurate to assume this relationship to be linear.

Usually the stack voltage range is different from the voltage range of the battery system 22 and it is beneficial to boost the stack voltage into this range the high voltage consumers have been designed for. Thus, a high voltage set-point on the bus 18 from the boost circuit 16 can be set equal to the stack voltage multiplied by a gain A plus an offset B as:

$$HV\ voltage\ set\text{-}point = stack\ voltage * A + B$$

The coefficients A and B are chosen during the design phase of the system 10 so that the above equation projects the fuel cell stack voltage range during system operation into the allowable high voltage bus voltage range.

The boost circuit 16 determines the high voltage set-point using the above equation and adjust the current draw from the stack 12 so that the voltage set-point is maintained. The supervisory controller 24 simultaneously determines the voltage limits for the high voltage components based on the stack lower voltage limit using the same equation. The calculations in the boost circuit 16 and the supervisory controller 24 do not interfere with each other. The voltage ranges of the high voltage bus voltage and the stack voltage could overlap, be non-overlapping or one voltage range could be within the other voltage range. The conversion between the voltage ranges could be provided by the equation, but also could be provided by other dependencies defined by other equations, tables, etc., as long as the particular function is strictly monotonically increasing.

The fuel cell boost circuit 16 will internally control the voltage on the bus 18, and the supervisory controller 24 will only command the boost circuit 16 to go into the voltage set-point mode when the battery system 22 fails. The boost circuit 16 determines the high voltage set-point based on the measured stack voltage on the line 14 multiplied by the gain A plus the offset B. The boost circuit 16 will then draw current from the stack 12 provided to the bus 18 to stabilize the voltage on the bus 18 at that set-point, which will change as the measured voltage changes.

At the same time that the boost circuit 16 is maintaining the high voltage set-point for the bus 18, the supervisory controller 24 can derive a minimum fuel cell stack voltage that the fuel cell boost circuit 16 can pull the stack 12 down to by drawing current without overloading the stack 12 at the stack operating conditions, i.e., stack media flows, stack temperature, etc. This minimum voltage is turned into a bus minimum voltage by using the same above equation in the supervisory controller 24 and distributed to the loads 20. The supervisory controller 24 sets the compressor speed and the hydrogen gas flow for a certain current output of the fuel cell stack 12 for the system operating conditions, and based on that current and known stack polarization curves, the controller 24 will know the corresponding minimum stack voltage for that maximum current. The supervisory controller 24 will then provide this high voltage lower limit to the controlled loads 20 on the line 30.

Figure 2:
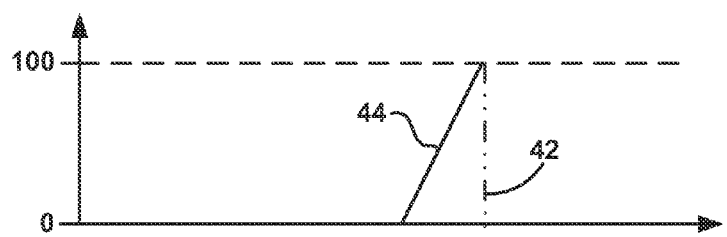
FIG. 2 is a graph with bus voltage on the horizontal axis and power on the vertical axis showing a load voltage limit.
Figure 3:
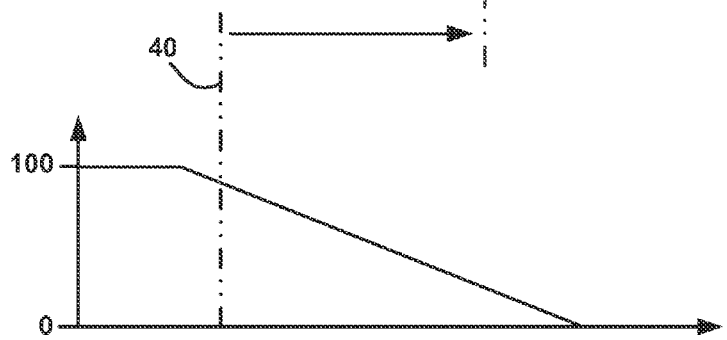
FIG. 3 is a graph with stack voltage on the horizontal axis and power on the vertical axis showing a stack voltage limit.

The relationship between the bus voltage and the stack voltage as provided by the above equation can be shown by the graphs in FIGS. 2 and 3, where FIG. 2 shows bus voltage on the horizontal axis and percentage of stack power on the vertical axis and FIG. 3 shows stack voltage on the horizontal axis and percentage of stack power on the vertical axis. The slope of the graph line in FIG. 3 shows how the stack voltage decreases as the current draw or power increases.

The more current the boost circuit 16 draws from the fuel cell stack 12 based on the demands from the controlled loads 20, the lower the voltage of the fuel cell stack 12. Thus, the actual bus voltage will be reduced. For a certain controlled media flow to the fuel cell stack 12, a maximum stack current can be provided. From this maximum current value, a minimum stack voltage can be identified. Line 40 in FIG. 3 shows a particular low stack voltage limit value that the voltage of stack 12 should not fall below relative to the stack power for a certain media flow. The minimum stack voltage identified by the line 40 can be converted to a load voltage limit value at line 42 using the equation above by the supervisory controller 24.

In contrast to the known operation with a fixed high voltage set-point for the fuel cell boost circuit 16, the present invention allows the advantages of voltage limiting features in the loads 20. The loads 20 can adjust their power draw from the high voltage bus 18 if the bus voltage reaches the distributed voltage limit. Load power line 44 in FIG. 3 shows how the controlled loads 20 reduce their power below the load voltage limit value. This is beneficial because at the same time the high voltage bus 18 reaches a lower voltage limit, the fuel cell stack 12 will also reach its lower voltage limit or its maximum power, respectively. While the supervisory controller 24 always attempts to maintain the high voltage bus power balance so that the limit is never exceeded, the present invention provides a very fast response if the supervisory controller 24 is reacting too slow to dynamically changing and uncontrolled high voltage bus loads.

The discussion above refers to a failed high voltage battery where the controlled loads 20 are tied to the voltage output of the battery. In an alternate architecture where the controlled loads 20 are tied to the output voltage of the fuel cell stack 12 and the fuel cell boost circuit 16 is a battery boost circuit, the same control scheme can be performed as discussed above for a failed fuel cell stack where the stack is disconnected from the high voltage bus and the vehicle is driven by the battery power. The battery boost circuit would control the bus voltage based on an equation and actual battery voltage, the supervisory controller would determine load voltage limits based on the same equation and the battery voltage limits. This again provides a very fast response if the supervisory controller 24 is reacting too slow to dynamically changing and uncontrolled high voltage bus loads.

While the discussion above refers to a battery and a fuel cell stack, a more general approach can be that a primary source for electric power is coupled to a high voltage bus and defines the bus voltage, and a secondary source for electric power is connected to the bus through a DC boost. If the primary power source fails and the secondary power source provides a strictly monotonic relationship between output power and output voltage, the voltage set-point of the bus can be applied as discussed above.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for setting a voltage level on a high voltage bus in a fuel cell system, said method comprising:
   electrically coupling a fuel cell stack to the high voltage bus through a fuel cell DC boost circuit;
   electrically coupling a high voltage battery to the high voltage bus;
   electrically coupling high voltage loads to the high voltage bus;
   determining whether the high voltage battery has failed;
   disconnecting the battery from the high voltage bus if the battery has failed;
   measuring the voltage of the fuel cell stack by the DC boost circuit;
   converting the measured voltage to a voltage set-point value in the fuel cell DC boost circuit that sets the voltage on the high voltage bus where the voltage set-point value changes as the measured voltage changes;
   determining a maximum current draw from the fuel cell stack based on a media flow to the fuel cell stack and converting the maximum current draw to a minimum stack voltage limit value; and
   converting the minimum stack voltage limit value to a high voltage bus lower limit value for the high voltage bus.

2. The method according to claim 1 wherein converting the measured voltage includes multiplying the measured voltage by a gain plus an offset.

3. The method according to claim 2 where the gain and the offset are selected during a design phase of the fuel cell system to project a fuel cell stack voltage range during system operation into an allowable high voltage bus voltage range.

4. The method according to claim 1 wherein converting the measured voltage includes using a strictly monotonic increasing relation.

5. The method according to claim 1 wherein converting the minimum stack voltage limit value to a high voltage bus lower limit value includes using a supervisory controller.

6. The method according to claim 1 further comprising using voltage limiting algorithms in the high voltage loads to prevent the loads from drawing more power from the high voltage bus than the high voltage bus lower limit value.

7. A method for controlling a voltage level on a high voltage bus in a fuel cell system, said method comprising:
   electrically coupling a fuel cell stack to the high voltage bus through a fuel cell DC boost circuit;
   defining a relationship between an output voltage of the fuel cell stack and the voltage on the high voltage bus;
   measuring the output voltage of the fuel cell stack by the DC boost circuit;
   converting the measured voltage to a voltage set-point value in the fuel cell DC boost circuit to set the voltage on the high voltage bus using the relationship where the voltage set-point value changes as the measured voltage changes;
   determining a maximum current draw from the fuel cell stack based on a media flow to the fuel cell stack;
   converting the maximum current draw to a minimum stack voltage limit value; and
   converting the minimum stack voltage limit value to a high voltage bus lower limit value using the relationship.

8. The method according to claim 7 wherein defining a relationship between an output voltage of the fuel cell stack and the voltage on the high voltage bus includes multiplying the measured voltage by a gain plus an offset.

9. The method according to claim 8 where the gain and offset are selected during a design phase of the fuel cell system to project a fuel cell stack voltage range during system operation into an allowable high voltage bus voltage range.

10. The method according to claim 7 wherein converting the measured voltage using a strictly monotonic increasing relation.

11. The method according to claim 7 further comprising using voltage limiting algorithms in high voltage loads that draw power from the high voltage bus to prevent the loads from drawing more power from the high voltage bus than the high voltage bus lower limit value.

12. The method according to claim 7 wherein converting the minimum stack voltage limit value to a high voltage bus lower limit value includes using a supervisory controller.

13. A method for controlling a voltage level on a high voltage bus in a fuel cell system, said method comprising:
   electrically coupling a fuel cell stack to the high voltage bus through a fuel cell DC boost circuit;
   defining a relationship between an output voltage of the fuel cell stack and the voltage on the high voltage bus;
   determining a maximum current draw from the fuel cell stack based on a media flow to the fuel cell stack;
   converting the maximum current draw to a minimum stack voltage limit value;
   converting the minimum stack voltage limit value to a high voltage bus lower limit value using the relationship; and
   using voltage limiting algorithms in high voltage loads that draw power from the high voltage bus to prevent the loads from drawing more power from the high voltage bus than the high voltage bus lower limit value.

14. The method according to claim 13 wherein defining a relationship between an output voltage of the fuel cell stack and the voltage on the high voltage bus includes multiplying the output voltage by a gain plus an offset.

15. The method according to claim 14 where the gain and the offset are selected during a design phase of the fuel cell system to project a fuel cell stack voltage range during system operation into an allowable high voltage bus voltage range.

16. The method according to claim 13 further comprising measuring the output voltage of the fuel cell stack by the DC boost circuit and converting the measured voltage to a voltage set-point value in the fuel cell DC boost circuit to set the voltage on the high voltage bus using the relationship where the voltage set-point value changes as the measured voltage changes.

17. The method according to claim 16 wherein converting the measured voltage includes using a strictly monotonic increasing relation.

18. A method for setting a voltage level on a high voltage bus in an electric power system, said method comprising:
   electrically coupling a primary electric power source to the high voltage bus;
   electrically coupling a secondary electric power source to the high voltage bus through a DC boost circuit;
   electrically coupling high voltage loads to the high voltage bus;
   determining whether the primary electric power source has failed;
   disconnecting the primary power source from the high voltage bus if the primary power source has failed;
   measuring the voltage of the secondary power source by the DC boost circuit;
   converting the measured voltage to a voltage set-point value in the DC boost circuit that sets the voltage on the high voltage bus where the voltage set-point value changes as the measured voltage changes; and
   using voltage limiting algorithms in the high voltage loads that draw power from the high voltage bus to prevent the loads from drawing more power from the high voltage bus than the voltage set-point.

19. The method according to claim 18 wherein converting the measured voltage includes multiplying the measured voltage by a gain plus an offset.

20. The method according to claim 18 wherein the gain and the offset are selected during the design phase of the electrical power system to project a secondary power source voltage range during system operation into an allowable high voltage bus voltage range.

21. The method according to claim 18 wherein converting the measured voltage includes using a strictly monotonic increasing relation.

* * * * *